March 17, 1959 — T. C. ESTES — 2,877,974
ADJUSTABLE BEAM CLAMP
Filed Jan. 6, 1954 — 3 Sheets-Sheet 1

Thomas C. Estes
INVENTOR.

March 17, 1959 T. C. ESTES 2,877,974
ADJUSTABLE BEAM CLAMP
Filed Jan. 6, 1954 3 Sheets-Sheet 2
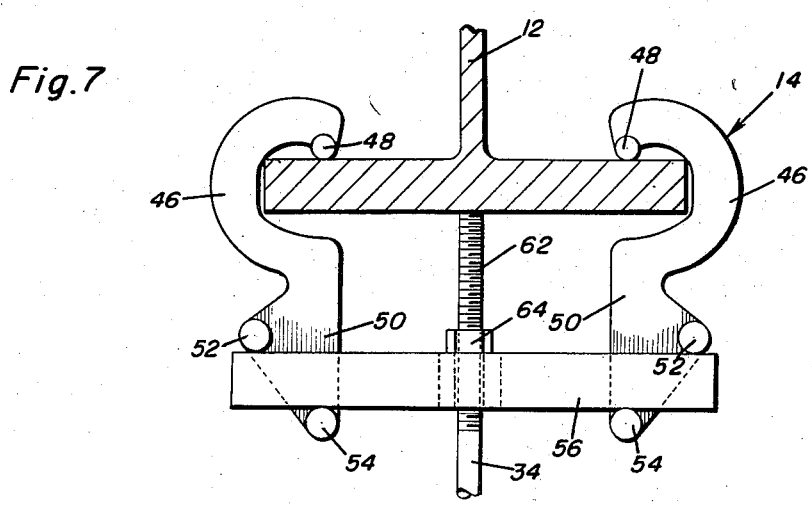
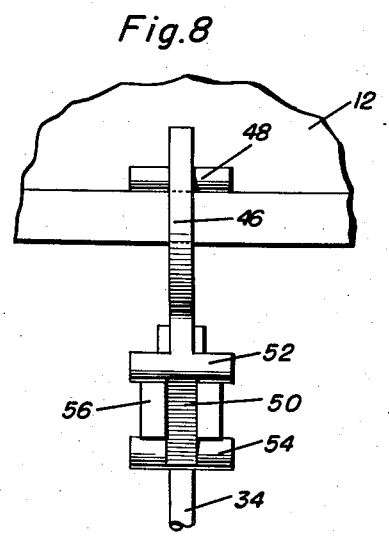
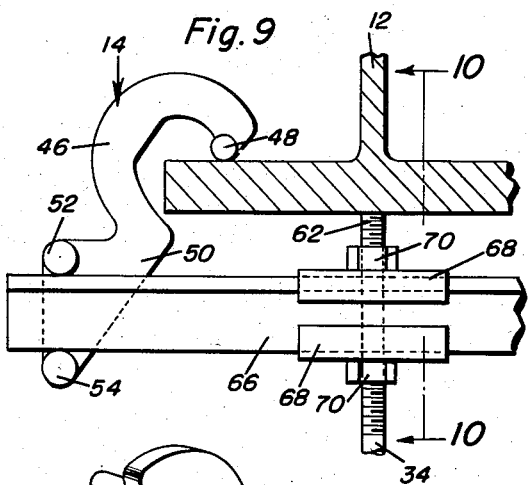
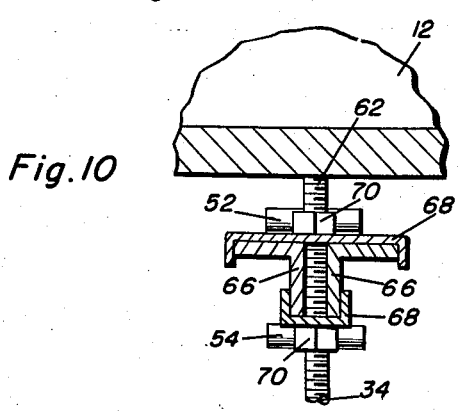
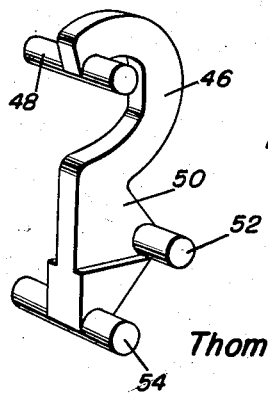
Thomas C. Estes
INVENTOR.

March 17, 1959 T. C. ESTES 2,877,974
ADJUSTABLE BEAM CLAMP
Filed Jan. 6, 1954 3 Sheets-Sheet 3
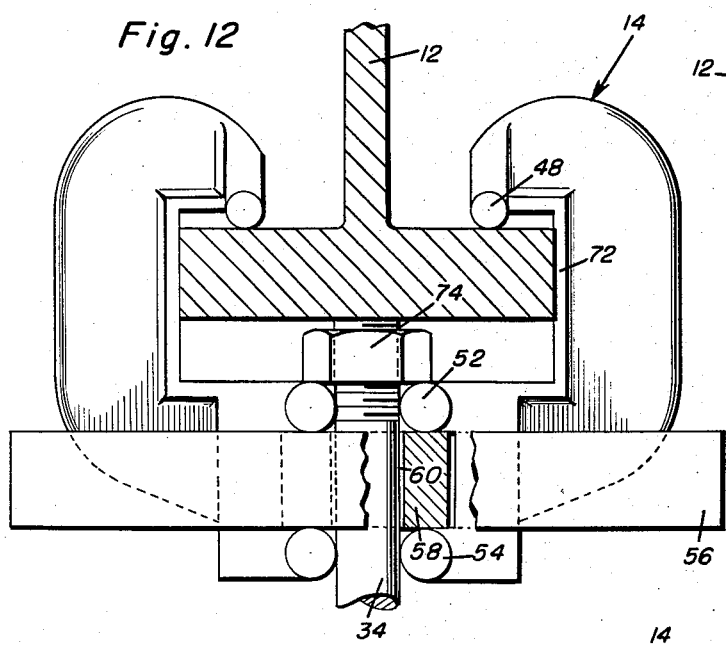
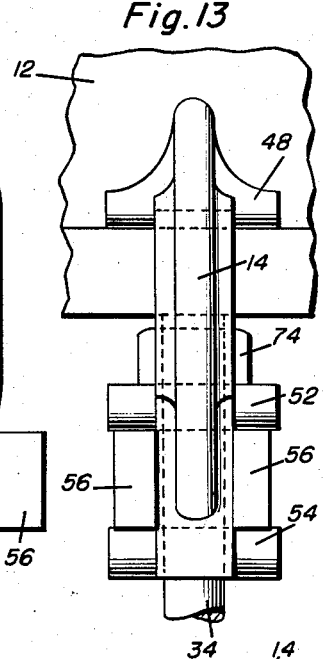
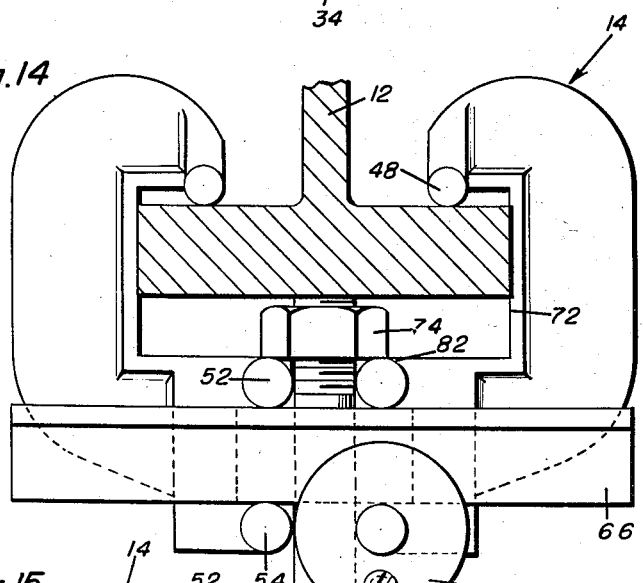
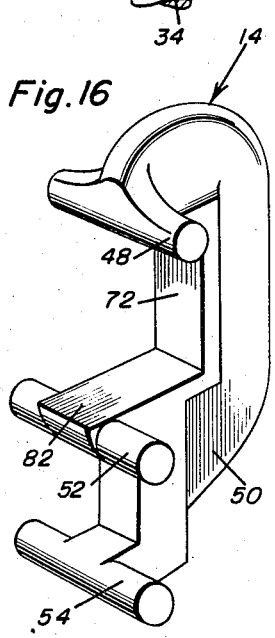
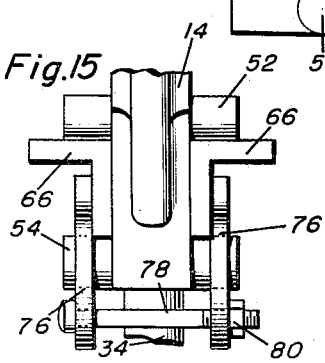
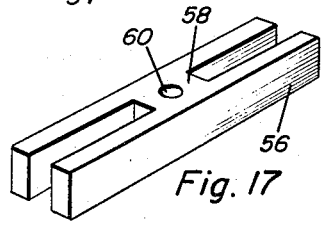
Thomas C. Estes
INVENTOR.
BY
Attorneys

United States Patent Office 2,877,974
Patented Mar. 17, 1959

2,877,974

ADJUSTABLE BEAM CLAMP

Thomas C. Estes, Dallas, Tex.

Application January 6, 1954, Serial No. 402,486

3 Claims. (Cl. 248—228)

This invention relates to an adjustable beam clamp and more specifically provides improved and novel beam clamp structures.

An object of this invention is to provide an adjustable beam clamp especially useful in suspending loads from the bottom flange of an I-beam or any similar type beam.

A further object of this invention is to provide an adjustable beam clamp, which is simple in construction, easy to assemble, safe in operation and relatively inexpensive to manufacture.

Yet another important object of this invention is to provide an adjustable beam clamp constructed of easily obtainable components which is easy to assemble and disassemble and adaptable for varied use.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 7 is side elevational view of another modification of the adjustable beam clamp;

Figure 8 is an end elevational view of the construction of Figure 7;

Figure 9 is a detail side elevational view showing a still further modified form of the beam clamp of this invention;

Figure 10 is a transverse, vertical section taken substantially along section line 10—10 of Figure 9 showing the U-shaped clips for retaining the right angle members of the device of Figure 9 in assembled relation;

Figure 11 is a detail perspective view showing one of the hooked shaped members utilized in the construction of Figures 7 and 9;

Figure 12 is a side elevational view with portions thereof in section showing still another modified form of the adjustable beam clamp of this invention;

Figure 13 is an end elevational view of the construction of Figure 12;

Figure 14 is a side elevational view of a still further modified form of the adjustable beam clamp of this invention;

Figure 15 is a detail end elevation showing the construction of Figure 14; and

Figure 16 is a detail perspective view showing one of the hook-shaped members utilized in the construction of Figures 12 and 14 and Figure 17 is detail perspective view showing the spacer as utilized in the construction of Figures 7 and 12.

Referring now specifically to the drawings, it will be seen that the numeral 10 generally designates the adjustable beam clamp of this invention for attachment to the bottom flange of an I-beam 12.

Figure 1:
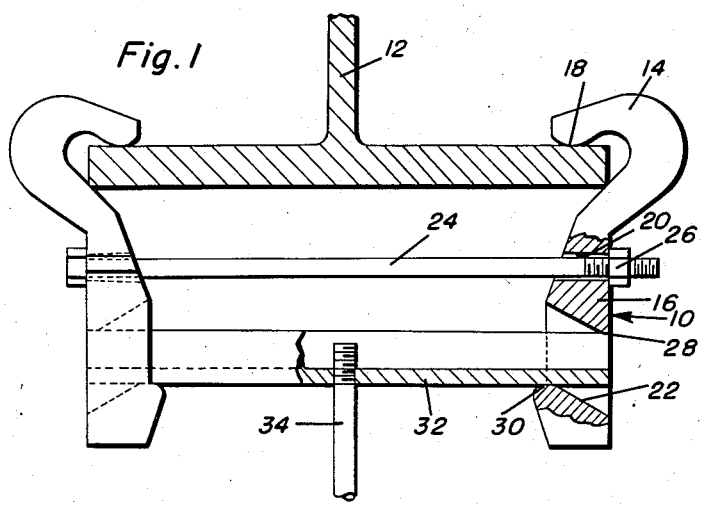
Figure 1 is a side elevational view with portions thereof in section showing the adjustable beam clamp of the present invention.
Figure 2:
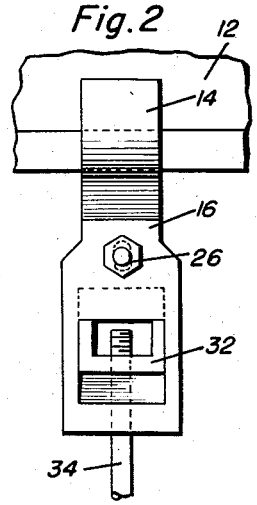
Figure 2 is an end elevational view of the construction of Figure 1.

Referring now specifically to Figures 1 and 2, it will be seen that the beam clamp 10 includes a pair of hook-shaped members 14 having a shank portion 16 and a hooked end portion 18 which engages the upper surface of the bottom flange of the I-beam 12 in a substantial line contact. The shank 16 of the hook-shaped members 14 is provided with vertically spaced apertures 20 and 22 and an elongated clamp bolt 24 extends between the shank portions 16 and is positioned in the upper apertures 20. The apertures 20 are somewhat larger in cross sectional area than the bolt 24 to permit the lower ends of the shank 16 to move inwardly toward each other when the nut 26 on the bolt 24 is tightened. The lower apertures 22 are generally polygonal in shape and include outwardly and downwardly inclined upper and lower walls thereby forming gripping edges 28 and 30. Extending between the shank 16 and disposed within the lower apertures 22 is a channel-shaped member 32 having the legs thereof facing upwardly and a threaded aperture in the central portion of the bight for receiving a supporting bolt 34. It will be seen that the gripping edges 28 and 30 engage the surfaces of the channel-shaped member 32 when the shank portions 16 of the hook-shaped members 14 are urged toward each other by the action of the clamp bolt 24.

Figure 3:
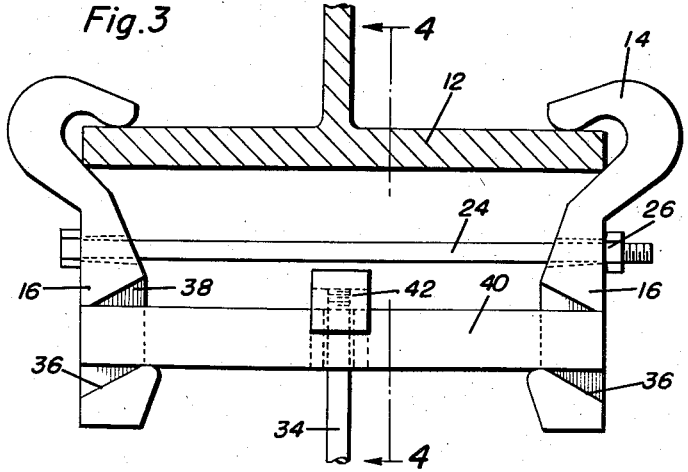
Figure 3 is a side elevational view of a modified form of the adjustable beam clamp of this invention.
Figure 4:
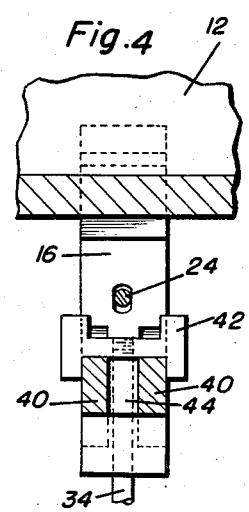
Figure 4 is a transverse, vertical section taken substantially along section line 4—4 of Figure 3 showing the details of construction of the beam clamp as illustrated in Figure 3.
Figure 5:
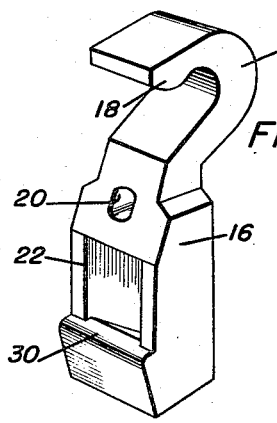
Figure 5 is a perspective detail view of one of the hook-shaped members utilized in the construction of Figure 1.
Figure 6:
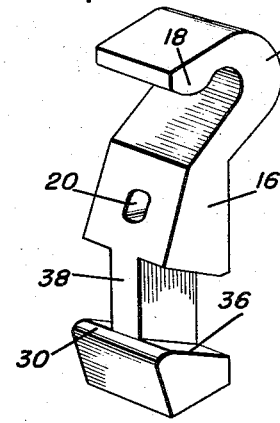
Figure 6 is a detailed perspective view of one of the hook-shaped members utilized in the construction of the beam clamp of Figure 3.

Referring now specifically to Figures 3 and 4, it will be seen that the hook-shaped members 14 are generally the same shape as those in Figures 1 and 2 and the shank portion 16 has oppositely disposed recessed portions 36 which form a centrally disposed rib 38. It will be seen that the upper and lower walls of the recessed portions 36 are outwardly and downwardly inclined for receiving and gripping the upper and lower edges of a pair of elongated rectangular plates 40. An H-shaped clip 42 is positioned centrally of the plates 40 and includes a projecting portion engaging the outer surfaces of the parallel plates 40. The central portion of the H-shaped clip is threaded for receiving a load-carrying bolt 34. It will be seen that the central portion of the plates 40 is joined together by an integral portion 44 having a suitable bore therein for receiving the bolt 34. The device of Figures 3 and 4 operates in exactly the same manner and the gripping edges 28 and 30 engage the plates 40 in the same manner as the channel-shaped member 32 upon movement of the shank 16 towards each other under actuation by the clamp bolt 24. As shown in Figures 5 and 6, the hook-shaped members are substantially the same at their upper ends for engaging the I-beam flange 12 and are different at their lower ends as the device of Figure 1 has apertures 22 and the device of Figure 3 has a pair of recessed portions 36 forming a central rib 38.

Referring now specifically to Figures 7-11, it will be seen that the hook-shaped members generally designated by the numeral 14 are constructed of a plate member 46. The hooked end portion of the plate 46 which engages the upper edge or surface of the I-beam flange 12 is provided with cylindrical projections 48 on each side thereof for engaging the I-beam flange 12 over a relatively long distance thereby preventing the tilting of the plate 46 in relation to the I-beam flange 12. Adjacent the lower end of the plate 46 designated by the numeral 50 is a shank provided with oppositely disposed projections 52 and 54 vertically spaced in relation to each other and disposed on opposite sides of the shank 50. The upper projections 52 are located adjacent the outermost edge of the shank 50 and the projections 54 are located below and towards the innermost edge of the shank 50. A spacer 56 including a pair of rectangular bars in parallel relation and having a centrally disposed integral part 58 has a bore 60 therethrough receiving the hanger bolt 34 which has an elongated threaded portion 62 with a nut 64 positioned thereon and engaging the upper surface of the integral portion 58. The upper end of the bolt 34 engages the under surface of the I-beam flange 12 thereby binding the hook shaped members 14 to the beam 12. The spacer 56 is positioned between the shanks 50 with the parallel bars of the spacer 56 disposed on opposite sides of the shank 50 and between the projections 52 and 54 with the projections bearing against the upper and under surface of the spacer 56 in longitudinal spaced relation. It will be understood that by manipulation of the nut 64, the spacer 56 is moved downwardly in relation to the I-beam flange 12 thereby binding the hook-shaped members 14 and the spacer 56 in rigid relation for binding the beam clamp 10 to the I-beam flange 12. In the embodiment as illustrated in Figures 9 and 10, a pair of right angle members 66 are disposed with their vertical flanges in parallel relation and spaced a substantial distance to receive the hanger bolt 34. A pair of U-shaped clips 68 are positioned over the lower edges of the vertical flanges of the angle members 66 and over the opposing edges of the horizontal flanges of the angle members 66 with a fastening nut 70 engaging the opposing surfaces of the clips 68 and threaded onto the bolt 34. The upper end of the threaded portion 62 of the bolt 34 engages the under surface of the I-beam flange 12 thereby binding the hook members 14 and the spacers 66 to the I-beam flange 12 in an obvious manner. It will be understood that the hook members 14 will accommodate various thicknesses and widths of spacers by swinging the hook members so that the vertical distance between the projections 52 and 54 will vary for receiving spacers having different height characteristics.

Referring now specifically to Figures 12-17, it will be seen that the hook-shaped members 14 are generally U-shaped in configuration having a polygonal recessed portion generally indicated by the numeral 72 forming the bight portion of the U-shaped hook-like members 14. The upper ends of the hooked-like members 14 are provided with outwardly flared projections 48 and the lower shank portion of the U-shaped member includes vertically spaced projections 52 and 54 which are generally spaced vertically above each other and receive therebetween the spacer comprising the parallel bars 56 and the integral central portion 58 having the bore 60 therethrough for receiving the hanger bolt 34. The hanger bolt 34 is provided with a nut 74 on the upper end thereof and the upper end of the bolt 34 abuts the under-surface of the I-beam flange 12 thereby rigidly binding the hooked members 14 to the flange 12. In the embodiment shown in Figure 14, the right angle members 66 are disposed between the projections 52 and 54 in spaced parallel relation for receiving therebetween the hanger bolt 34 which has the nut 74 on the upper end thereof with the upper end of the bolt 34 engaging the under surface of the I-beam flange 12. A pair of the lower projections 54 are provided with removable circular plates 76 positioned over the remote ends thereof and engaging the opposing surfaces of the right angle member 66. The plates 76 are held in assembled relation on the projections 54 and in engagement with the flanges 66 by a clamp bolt 78 extending between the plates 76 below the hook member 74.

The clamp bolt 78 has a suitable nut 80 thereon for clamping the plates 76 securely against the surfaces of the right angle member 66 thereby rigidly securing the members 66 in parallel spaced relation against the surface of the lower of the hook-members 14 which are generally U-shaped in character. In the specific embodiments illustrated in Figures 12 and 14, the bolt 34 is engaged by the nut 74 in the usual manner and the nut 74 is positioned on and supported by the upper surfaces 82 of the lower portion of the U-shaped hook members 14. However, it will be understood that in other circumstances, the nut 74 may engage the upper surface of the spacers 56 or 66 as desired.

The operation of the devices are substantially the same and it will be noted that all of the elements of the adjustable beam clamps of this invention may be constructed of readily obtainable stock material thereby enhancing the economic feasibility and salability of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A beam clamp comprising a pair of substantially hook-shaped members disposed in facing relation for engagement over opposite edges of a beam flange, each of said members having a depending shank portion, each of said shank portions including a pair of vertically spaced lateral projections, elongated means interconnecting the shank portions and extending between the projections on each shank portion, and load supporting means extending through said elongated means, each of said shank portions terminating in an inwardly extending portion underlying the beam flange in spaced relation, each of said projections including a stud extending from each side of the shank portion, said elongated means including a pair of right angle members having a vertical flange disposed against the shank portions with the lower edge engaging the lower studs and a horizontal flange engaging the upper studs thus precluding any substantial pivotal movement of the hook-shaped members, means for retaining the right angle members in spaced parallel relation, said load supporting means including a bolt extending between the vertical flanges of the right angle member, a nut on the upper end of the bolt, said nut resting on the upper edges of the inwardly extending portions of the shank portions.

2. The combination of claim 1 wherein said means for retaining the right angle members in parallel relation includes a pair of plates disposed on the studs and engaging the outer surfaces of the vertical flanges, and a clamp bolt extending through said plates for urging the same together thus rigidly clamping the right angle members against the shank portions.

3. A beam clamp comprising a pair of substantially hook-shaped members disposed in facing relation for engagement over the opposite edges of a generally horizontal beam flange, a depending shank portion on each of said hook-shaped members, the hooked end of each member engaging the inner surface of the beam flange, a pair of vertically spaced lateral abutments on each shank portion, generally horizontal transverse interconnecting means disposed parallel to the beam flange, the outer ends of the interconnecting means extending between the vertically spaced lateral abutments and with the upper and lower edges disposed against the abutments thereby limiting swinging movement of the hook-shaped members in relation to the interconnecting means, a vertical extending load supporting member disposed in a vertical plane between the shank portions with the upper end thereof terminating above the horizontal plane of the lower abutments, and means on the upper end of said load supporting member in supporting engagement with said hook shaped members, the positioning of the abutments preventing swinging movement of each of the hook-shaped members about a transverse axis generally coincidental with the transverse center of the interconnecting means and located intermediate the pair of abutments.

References Cited in the file of this patent

UNITED STATES PATENTS

| | | |
|---|---|---|
| 1,795,808 | Thompson | Mar. 10, 1931 |
| 1,974,628 | Presley | Sept. 25, 1934 |
| 1,983,670 | Knight | Dec. 11, 1934 |
| 2,516,481 | Otis | July 25, 1950 |